United States Patent
Liu et al.

(10) Patent No.: US 9,460,450 B2
(45) Date of Patent: Oct. 4, 2016

(54) METHOD AND APPARATUS FOR PROVIDING APPLICATION LIST

(75) Inventors: Ruiping Liu, Shenzhen (CN); Yan Luo, Shenzhen (CN); Xin Huang, Shenzhen (CN); Juan Huang, Shenzhen (CN); Xiaofei Zuo, Shenzhen (CN); Xianming Cui, Shenzhen (CN); Xiongwei Li, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 929 days.

(21) Appl. No.: 13/640,262

(22) PCT Filed: Aug. 17, 2010

(86) PCT No.: PCT/CN2010/076055
§ 371 (c)(1),
(2), (4) Date: Oct. 9, 2012

(87) PCT Pub. No.: WO2011/150591
PCT Pub. Date: Dec. 8, 2011

(65) Prior Publication Data
US 2013/0030954 A1    Jan. 31, 2013

(30) Foreign Application Priority Data
Jun. 2, 2010    (CN) .......................... 2010 1 0190825

(51) Int. Cl.
G06Q 30/00    (2012.01)
G06Q 30/02    (2012.01)
G06F 9/445    (2006.01)

(52) U.S. Cl.
CPC ............ *G06Q 30/0246* (2013.01); *G06F 8/61* (2013.01)

(58) Field of Classification Search
CPC .......................... G06Q 30/00; G06Q 30/0269
USPC ................................................. 705/26.1, 27.1
See application file for complete search history.

(56) References Cited

U.S. PATENT DOCUMENTS

| 6,763,379 B1 | 7/2004 | Shuster |
| 2004/0043753 A1 | 3/2004 | Wake |

(Continued)

FOREIGN PATENT DOCUMENTS

| CN | 1736092 A | 2/2006 |
| CN | 1866996 A | 11/2006 |

(Continued)

OTHER PUBLICATIONS

Anonymous, "Green Packet Creates Opportunity for Operators to Partake in Application Store Frenzy," Business Wire, Nov. 16, 2009.*

(Continued)

*Primary Examiner* — Brandy A Zukanovich
(74) *Attorney, Agent, or Firm* — Oppedahl Patent Law Firm LLC

(57) ABSTRACT

The present disclosure provides a method for providing an application list. The method includes: a mobile terminal records and processes information on a user's usage of third party applications to obtain history data about the third party applications, matches the history data about the third party applications with application information in a database of an application store, forms a third party application selection list from the matched result, and pushes the content of the third party application selection list to a display interface of the application store on the mobile terminal. An apparatus for providing an application list is also provided. The method and the apparatus can push different third party application selection lists to different users, display the third party applications in which users may be interested to indirectly realize user's customization, enable a user to rapidly choose and purchase the third party applications the user like, improve the purchasing and using ratio of various applications in the application store, and ensure Average Revenue Per User (ARPU) of an operator.

8 Claims, 2 Drawing Sheets

(56) References Cited

U.S. PATENT DOCUMENTS

| | | |
|---|---|---|
| 2005/0021612 A1 | 1/2005 | Shuster |
| 2006/0109734 A1 | 5/2006 | Fukuda |
| 2006/0200432 A1 | 9/2006 | Flinn |
| 2006/0265409 A1 | 11/2006 | Neumann et al. |
| 2006/0271618 A1 | 11/2006 | Kokubo |
| 2007/0050374 A1 | 3/2007 | Zhao et al. |
| 2008/0250323 A1* | 10/2008 | Huff ................. G06F 9/4446 715/733 |
| 2009/0076919 A1 | 3/2009 | Shuster |
| 2009/0307105 A1* | 12/2009 | Lemay ................. G06F 8/61 705/26.1 |
| 2010/0318603 A1 | 12/2010 | Shuster |
| 2012/0042276 A1 | 2/2012 | Shuster |

FOREIGN PATENT DOCUMENTS

| | | |
|---|---|---|
| CN | 101271558 A | 9/2008 |
| CN | 101421754 A | 4/2009 |

OTHER PUBLICATIONS

International Search Report in international application No. PCT/CN2010/076055, mailed on Mar. 17, 2011.

English Translation of the Written Opinion of the International Search Authority in international application No. PCT/CN2010/076055, mailed on Mar. 17, 2011.

Supplementary European Search Report in European application No. 10852388.7, mailed on Aug. 23, 2013. (6 pages).

\* cited by examiner

METHOD AND APPARATUS FOR PROVIDING APPLICATION LIST

TECHNICAL FIELD

The present disclosure relates to the field of terminal communication, in particular to a method and apparatus for providing an application list for a mobile terminal.

BACKGROUND

Thanks to desirable supportability and scalability of mobile terminals to third party software, many mobile terminal producers have launched mobile terminal application stores, for example, Apple's App Store, Nokia's Ovi Store, Google's Android Market and ChinaMobile's Mobile Market. A research institution reports that from 2008 to nowadays, the operation of application stores on a mobile terminal has become very mature in European developed countries and regions, meanwhile Chinese mobile terminal market is entering a stage of high-speed development. For example, in 2009, about 52% of the Smart Phone users viewed or downloaded and installed application software through Smart Phone application stores. At the end of 2009, there were 35.72 million Smart Phone users. In the next two years, the customer numbers of the mobile terminal application stores will grow fast. It is estimated that the number of customers will reach 66.33 million by 2010 and exceed 100 million by 2011.

In these virtual mobile terminal application stores, the number of applications varies from a few hundreds to more than 100 thousand. This facilitates user's download, installation and use according to his/her own needs at any time and also brings about considerable income for operators and original equipment manufacturers (OEM). However, the classification and sequencing methods of the application stores are relatively fixed currently, for example, classification is made by themes, sports, animations or multimedia and other types, wherein sequencing is done by letter order or degree of popularity in each type. For mobile terminal users, as different users may have different favour, the sequencing by degree of popularity, i.e., TOP ranking, is unable to cover all types in which users are interested. Therefore, on one hand, users spend much time on looking for the applications they like from tens of thousand applications; on the other hand, the operators suffer drain of some potential users and influence to ARPU (Average Revenue Per User).

SUMMARY

Based on the above, the main object of the present disclosure is to provide a method and apparatus for providing an application list. The method and apparatus can provide applications in which users are interested, display the applications on a display interface of the application store and enable the users to rapidly purchase third party applications through this interface.

The technical solution of the present disclosure solves the above technical problem in the following way.

A method for providing an application list, which includes the following steps:

a mobile terminal records and processes information on a user's usage of third party applications to obtain history data about the third party applications;

the history data about the third party applications is matched with application information in a database of an application store and a third party application selection list is formed from a result of the matching; and a content of the third party application selection list is pushed to a display interface of the application store on the mobile terminal.

Recording and processing the information on the user's usage of the third party applications may include: acquiring attribute values of the third party applications viewed by the user or downloaded and installed by the user, and processing and sequencing the attribute values according to the information on the user's usage of the third party applications.

Matching the history data about the third party applications with the application information in the database of the application store may include: when the user enters an application store, the attribute values sequenced in front are fuzzily matched with the application information of corresponding attribute values in the database of the application store based on a keyword.

The attribute values of the third party application may be a classificatory attribute values or a spatial range. Acquiring the attribute values and processing and sequencing the attribute values according to the information on the user's usage of the third party applications may specifically include: acquiring the classificatory attribute values or the spatial range of the third party applications viewed by the user or downloaded and installed by the user, recording use frequency of the classificatory attributes or the spatial ranges, and sequencing the classificatory attribute values or the spatial ranges according to the recorded use frequency.

Matching the history data about the third party applications with the application information in the database of the application store may further include:

when the user enters the application store, the classificatory attribute values sequenced in front are fuzzily matched with application information of corresponding classificatory attribute values in the database of the application store based on keywords; or when the user enters the application store, the spatial ranges sequenced in front are fuzzily matched with application information that occupies a space within a corresponding spatial range in the database of the application store based on keywords.

The keyword may be a common keyword set by a mobile terminal manufacturer when the mobile terminals leave a factory and/or a specific keyword set by users in mobile terminals according to his/her favour during the use of the mobile terminal.

There may be one or more keywords for fuzzy matching.

Pushing the content of the third party application selection list to the display interface of the application store on the mobile terminal may further include: the content of the third party application selection list is pushed to the display interface of the application store on the mobile terminal in the form of a status bar.

An apparatus for providing an application list, which comprises:

a recording module, configured to record and process information on a user's usage of third party applications to obtain history data about the third party applications;

a matching module, configured to match the history data about the third party applications with application information in a database of an application store;

a list generation module, configured to form a third party application selection list from a result of the matching and send it to a display output module; and the display output module, configured to provide a content of the third party application selection list to a display interface of the application store on a mobile terminal.

The recording module may be further configured to: acquire attribute values of the third party applications viewed by the user or downloaded and installed by the user, and process and sequence the attribute values according to the information on the user's usage of the third party applications to obtain the history data about the third party applications; and/or, the matching module may be further configured to: fuzzily match the attribute values sequenced in front in the history data about the third party applications with the application information of corresponding attribute values in the database of the application store; and/or, the display output module may be further configured to: push the content of the third party application selection list to the display interface of the application store on the mobile terminal in the form of a status bar.

Compared with the related art, a method and apparatus for providing an application list by a mobile terminal in the present disclosure can push different third party application selection lists to different users, display the third party applications in which users may be interested to indirectly realize user's customization, reduce the time the users spend on manual search among tens of thousand third party applications, enable the users to rapidly choose and purchase the third party applications the users like, save time for the users, raise users' satisfaction and improve the purchasing and using ratio of various applications in the application store. The solution according to the present disclosure can enhance user experience and ensure Average Revenue Per User (ARPU) of an operator.

DETAILED DESCRIPTION

Basic thought of the present disclosure is: a mobile terminal records and processes information on a user's usage for a third party application to obtain history data about the third party applications, matches the history data about the third party applications with application information in a database of an application store to form a third party application selection list from the matched result, and pushes the content of the third party application selection list to a display interface of the application store on the mobile terminal.

The present disclosure will be further described below by referring to the accompanying drawings and embodiments.

Figure 1:
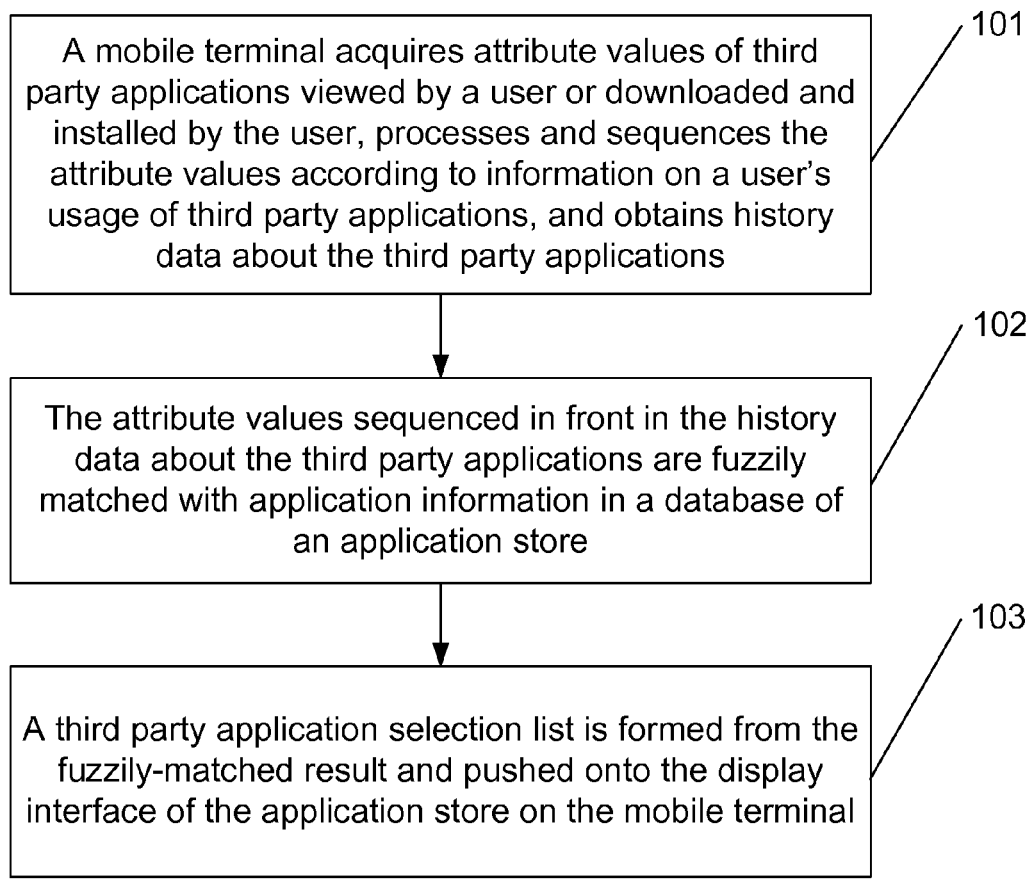
FIG. 1 is a schematic of a working process for providing an application list in the present disclosure.

FIG. 1 is a schematic of a working process for providing an application list in the present disclosure. As shown in FIG. 1, the following steps are included:

S101, a mobile terminal acquires attribute values of third party applications viewed by a user or downloaded and installed by the user, processes and sequences the attribute values according to information on the user's usage for the third party applications, and obtains history data about the third party applications.

Specifically, third party applications have category, installation time, occupied space and other attribute values. All third party applications in a same category have a same classificatory attribute value. For examples, Cycle Racing and Tetris are third party applications in the category of Games and their classificatory attribute values are Game. When a user views or a user downloads and installs a third party application, the mobile terminal reads out the classificatory attribute value of the third party application, and records it based on use frequency of the classificatory attribute. In other words, if there is no corresponding classificatory attribute value in the history data about the third party applications, and the user views or downloads the third party application in a specific category for the first time, then the mobile terminal will store the classificatory attribute value of the third party application viewed by the user or downloaded and installed by the user to the history data about the third party applications, and record corresponding use frequency of the classificatory attribute value as 1. If there is a corresponding classificatory attribute value in the history data about the third party applications, for example, the user has viewed or downloaded third party applications in the corresponding category before, the mobile terminal will add 1 to the corresponding use frequency of the classificatory attribute value, sequence all the classificatory attribute values in the history data about the third party applications in a descending order of the recorded use frequency, and may obtain top X classificatory attribute values (i.e., TOP X), wherein X may be set by the user according to actual needs, for example, X may be set as 3. The history data about the third party applications may be realized in the form of a database, and its storage may be realized through arranging a database storage area in memory. The cumulative updating of a mobile terminal's use frequency of the classificatory attribute values of third party applications viewed or downloaded by a user may be realized through a current sequencing function.

S102, attribute values sequenced in front in the history data about the third party applications are fuzzily matched with application information in a database of an application store.

Keywords are set in a mobile terminal, wherein the keywords may be common keywords set in the mobile terminal by a mobile terminal manufacturer when the mobile terminal leaves a factory, or specific keywords set by a user in the mobile terminal according to his/her favour when he/she uses the mobile terminal, or their combination.

Figure 2:
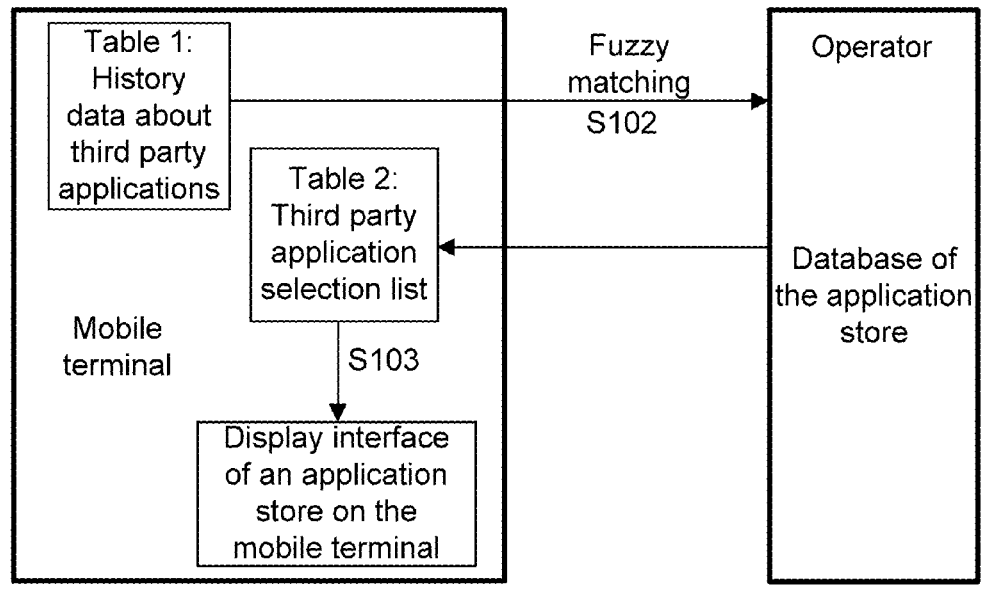
FIG. 2 is a schematic of a working principle for providing an application list in the present disclosure.

The attribute values sequenced in front are fuzzily matched with the application information in the database of the application store. Specifically, when a user enters an application store, the attribute values sequenced in front are fuzzily matched with the application information of corresponding attribute values in the database of the application store based on keywords, as shown in FIG. 2. In S101, when sequencing is done by the use frequency of classificatory attribute values, the mobile terminal fuzzily matches the classificatory attribute values sequenced in front with the application information of corresponding classificatory attribute values in the database of the application store based on keywords.

For example, if top 3 classificatory attribute values in the history data about the third party applications are A, B and C, while the keyword set in the mobile terminal is "a", then based on the keyword "a", the mobile terminal fuzzily matches the application information of each third party application of which classificatory attribute values are A, B and C in the database of the application store. During the fuzzy matching, "like" variable may be adopted to realize the fuzzy matching between keywords and the application information of the third party applications of the corresponding classificatory attribute values in the database of the application store. For example, when the keyword "a" set in a mobile terminal is read out, the condition for fuzzy matching with a database of an application store will be like '%"a"%'. It means all the third party applications of which application information contains character "a" meet the condition, thereby the fuzzy matching is realized. According to the above process, the mobile terminal obtains all the third party applications of which classificatory attribute value is one of A, B and C and of which application information contains the keyword 'a'. That is, all the third party applications of which application information contains the keyword "a" in category A, category B and category C are obtained through the fuzzy matching.

If a plurality of keywords is set in a mobile terminal, then the third party applications obtained through fuzzy matching based on keywords may be repeated. The mobile terminal only needs to keep one record of the repeated applications.

Furthermore, accurate matching may also be performed based on a plurality of keywords to make the matching result more compliant with user's use requirements.

S103, a third party application selection list is formed from the fuzzily matched result and pushed to the display interface of the application store on the mobile terminal.

Specifically, the mobile terminal provides the content of the third party application selection list to the display interface of the application store on the mobile terminal in the form of a status bar.

The interaction between a mobile terminal and a database of an application store is shown in FIG. 2. The mobile terminal establishes a connection with the database of the application store, fuzzily matches TOP X classificatory attribute values in the history data about the third party applications with the application information of the third party application of the corresponding classificatory attribute values in the database of the application store based on keywords, and obtains a third party application selection list from the fuzzily matched result to provide to users.

Through the above processing, the users can rapidly choose and purchase the third party applications the users like according to the status bar pushed onto the display interface of the application store on the mobile terminal.

As the mobile terminal conducts real-time recording based on the information on the user's usage for third party applications, the third party application selection list provided by the mobile terminal for the users are dynamically updated whenever they enter the application store, so as to make the third party application selection list provided for the users more compliant with their use requirements.

The above processing may be specifically realized through a third party application tracking and recording program in the mobile terminal.

Figure 3:
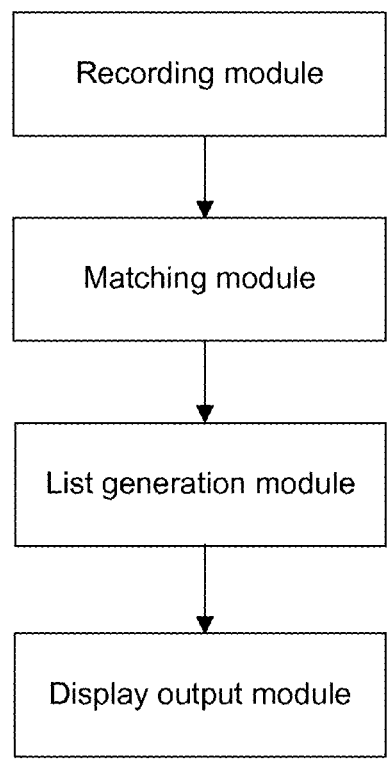
FIG. 3 is a structure of an apparatus for providing an application list in the present disclosure.

FIG. 3 is a structure of an apparatus for providing an application list in the present disclosure. As shown in FIG. 3, the apparatus comprises a recording module, a matching module, a list generation module and a display output module, wherein the recording module is configured to record and process the information on a user's usage for a third party application to obtain history data about the third party applications; the matching module is configured to match the history data about the third party applications with the application information in an database of the application store; the list generation module is configured to form a third party application selection list from the matched result, and send it to a display output module; and the display output module is configured to push the content of the third party application selection list to the display interface of the application store on the mobile terminal.

Specifically, the recording module is configured to acquire attribute values of third party applications viewed by a user or downloaded and installed by a user, sequence attribute values according to the information on the user's usage for the third party applications, and obtain the history data about the third party applications.

The matching module is specifically configured to fuzzily match the attribute values sequenced in front in the history data about the third party applications with the application information of corresponding attribute values in a database of an application store.

The display output module is specifically configured to push the content of the third party application selection list to the display interface of the application store on the mobile terminal in the form of a status bar.

As the realization of each module has been described in details in relevant part of the process, the description thereof is omitted here.

The realization of the present disclosure is further described below by taking occupied space as an attribute value.

An attribute value representing the space occupied by third party applications takes spatial range as a criterion to classify the third party applications. That is to say, a number of spatial ranges are defined based on the space occupied by a third party application. For example, 0M~5M of space is spatial range A, 5M~10M of space is spatial range B, and so on. Subsequently, recording and fuzzy matching are conducted based on this classification of spatial ranges. When a user enters an application store and the user views or the user downloads and installs a third party application, the mobile terminal reads the space occupied by a third party application, and records the use frequency of the corresponding spatial range. In other words, if there is no corresponding spatial range in the history data about the third party applications and the user views or downloads the third party application in the spatial range for the first time, the mobile terminal will store the spatial range of the third party application viewed by the user or downloaded and installed by the user the history data about the third party applications, and record the use frequency of the spatial range as 1; if there is a corresponding spatial range in the history data about the third party applications and the user has viewed or downloaded a third party application in the corresponding spatial range before, the mobile terminal will add 1 to the use frequency of the spatial range, sequence all the spatial ranges in the history data about the third party applications in a descending order of the recorded use frequency to obtain top X spatial ranges, i.e., TOP X. If the top 1 spatial range in the history data about the third party applications is spatial range B and the keyword set in the mobile terminal is "a", then the mobile terminal fuzzily matches with all the third party applications of which occupied space in the database of the application store is spatial range B based on the keyword "a", so as to form a third party application selection list from the matched result and push the result to the display interface of the application store on the mobile terminal.

Specifically, the spatial range of the space occupied by a third party application may be classified in the following two ways: the mobile terminal manufacturer sets common spatial ranges in mobile terminals before the mobile terminals leave a factory, or users may set specific spatial ranges in their mobile terminals during the use of the mobile terminals according to their favour, or their combination.

From the above description, it may be seen that in the solution for providing an application list described in the present disclosure, the mobile terminal can, in background process, automatically record the category and other attribute values of an application viewed by the user or downloaded and installed by the user. Through analyzing data, the mobile terminal can provide different third party application selection lists for different users entering an application store, display the third party applications in which the users may be interested, and enable the users to rapidly choose and purchase the third party applications the users like.

The above description is preferred embodiments of the present disclosure and are not intended to limit the protection scope of the present disclosure. All modifications, identical replacements and improvements made without departing from the spirit and principle of the present disclosure shall be within the protection scope of the present disclosure.

The invention claimed is:

1. A method for providing an application list, comprising:
recording and processing, by a mobile terminal, information on a user's usage of third party applications to obtain history data about third party applications;
matching the history data about third party applications with application information in a database of an application store and forming a third party application selection list from a result of the matching; and
pushing a content of the third party application selection list to a display interface of the application store on the mobile terminal,
wherein the recording and processing, by the mobile terminal, the information on the user's usage of third party applications to obtain the history data about third party applications comprises:
in response to recording a third party application being viewed or downloaded and installed by the user, obtaining, by the mobile terminal, an attribute value of the third party application viewed or downloaded and installed, and increasing a use frequency of the attribute value in the history data about third party applications by 1; sequencing attribute values in the history data about third party applications in a descending order of recorded use frequencies of the attribute values to obtain top-X attribute values in the history data about third party applications, X being a set number;
and the matching the history data about third party applications with the application information in the database of the application store and forming the third party application selection list from the result of the matching comprises:
establishing, by the mobile terminal, a connection with the database of the application store at an operator side;
recording, by the mobile terminal, a third party application in the database of the application store having one of the top-X attribute values and application information containing a keyword;
obtaining, by the mobile terminal, the third party application selection list comprising the recorded third party application in the database of the application store having one of the top-X attribute values and application information containing the keyword.

2. The method of claim 1, wherein the attribute value of the third party application comprises a classification or a spatial range.

3. The method of claim 1, wherein the keyword comprises a manufacturer-preset common keyword and/or a user-set specific keyword.

4. The method of claim 1, wherein the keyword comprises one or more keywords.

5. The method of claim 1, wherein the pushing the content of the third party application selection list to the display interface of the application store on the mobile terminal comprises: pushing the third party application selection list to the display interface of the application store on the mobile terminal in the form of a status bar.

6. A mobile terminal, comprising:
a processor;
memory in electronic communication with the processor;
instructions stored in the memory, the instructions being executable by the processor for:
recording and processing information on a user's usage of third party applications to obtain history data about third party applications;
matching the history data about third party applications with application information in a database of an application store and forming a third party application selection list from a result of the matching; and
pushing a content of the third party application selection list to a display interface of the application store on the mobile terminal,
wherein the recording and processing the information on the user's usage of third party applications to obtain the history data about third party applications comprises:
in response to recording a third party application being viewed or downloaded and installed by the user, obtaining an attribute value of the third party application viewed or downloaded and installed, and increasing a use frequency of the attribute value in the history data about third party applications by 1; sequencing attribute values in the history data about third party applications in a descending order of recorded use frequencies of the attribute values to obtain top-X attribute values in the history data about third party applications, X being a set number;
and the matching the history data about third party applications with the application information in the database of the application store and forming the third party application selection list from the result of the matching comprises:
establishing a connection with the database of the application store at an operator side;
recording a third party application in the database of the application store having one of the top-X attribute values and application information containing a keyword;
obtaining the third party application selection list comprising the recorded third party application in the database of the application store having one of the top-X attribute values and application information containing the keyword.

7. The mobile terminal of claim 6, wherein
the pushing the content of the third party application selection list to the display interface of the application store on the mobile terminal comprises: pushing the third party application selection list to the display interface of the application store on the mobile terminal in the form of a status bar.

8. The method of claim 2, wherein the pushing the content of the third party application selection list to the display interface of the application store on the mobile terminal comprises: pushing the third party application selection list to the display interface of the application store on the mobile terminal in the form of a status bar.

\* \* \* \* \*